United States Patent [19]

Henriksson

[11] Patent Number: 5,560,561

[45] Date of Patent: Oct. 1, 1996

[54] BAIL MECHANISM IN AN OPEN-FACE FISHING REEL OF THE FIXED-SPOOL TYPE

[75] Inventor: Bengt-Åke Henriksson, Svängsta, Sweden

[73] Assignee: ABU AB, Svängsta, Sweden

[21] Appl. No.: 378,823

[22] Filed: Jan. 27, 1995

[51] Int. Cl.$^6$ ............................................. A01K 89/01
[52] U.S. Cl. ..................... 242/231; 384/495; 242/157 R
[58] Field of Search .................................. 242/230, 231, 242/232, 233, 321, 157 R; 384/495, 547

[56] References Cited

U.S. PATENT DOCUMENTS

| 1,657,576 | 1/1928 | Joyce | 242/157 R |
| 4,208,020 | 6/1980 | Gifford | 242/231 X |
| 4,562,976 | 1/1986 | Ban | 242/231 |

FOREIGN PATENT DOCUMENTS

| 0264794 | 2/1989 | Germany | 242/157 R |

Primary Examiner—Daniel P. Stodola
Assistant Examiner—Emmanuel M. Marcelo
Attorney, Agent, or Firm—Browdy and Neimark

[57] ABSTRACT

A bail mechanism in an open-face fishing reel of the fixed-spool type having a rotor and a line spool which is coaxial with the rotor and oscillates in the axial direction, has a bail for winding a line onto the line spool. By means of two mounting elements, the bail is mounted on two attachments disposed diametrically opposite each other on the rotor. The bail is pivotable about a bail axis perpendicular to the axis of the rotor, between a folded-in line-winding position and a folded-out position, in which the bail is released of the line. A holder, which is fixed to the bail at one end thereof, is connected to one of the mounting elements. A shaft is provided between the holder and this mounting element. A line roller having a circumferential line-guiding groove in its outer circumferential surface, is mounted on the shaft so as to guide the line when being wound onto the line spool. The shaft has a radially projecting, circumferential bead, on which the line roller is mounted and which is so designed that the line roller is tiltable in relation to the shaft about an axis perpendicular thereto.

8 Claims, 5 Drawing Sheets

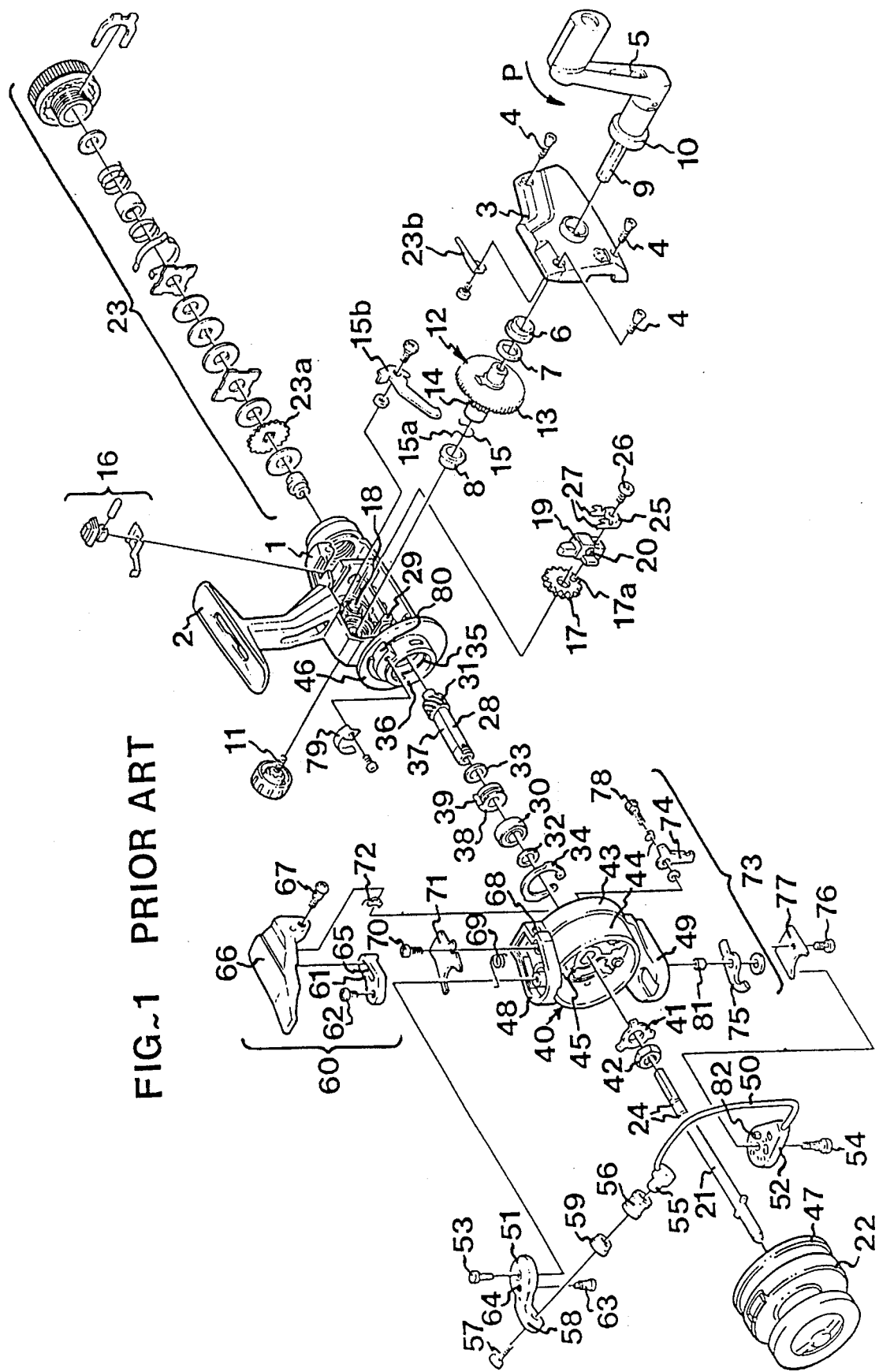
FIG_1 PRIOR ART

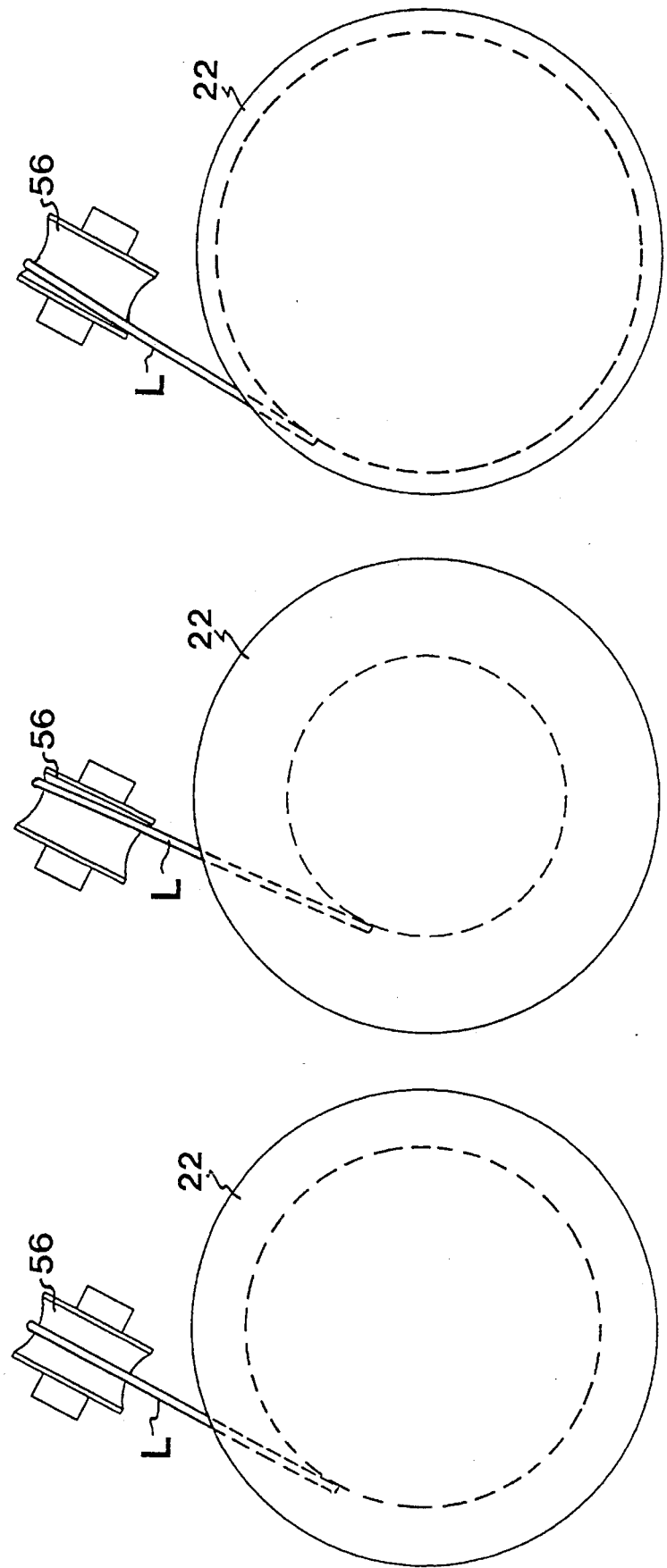

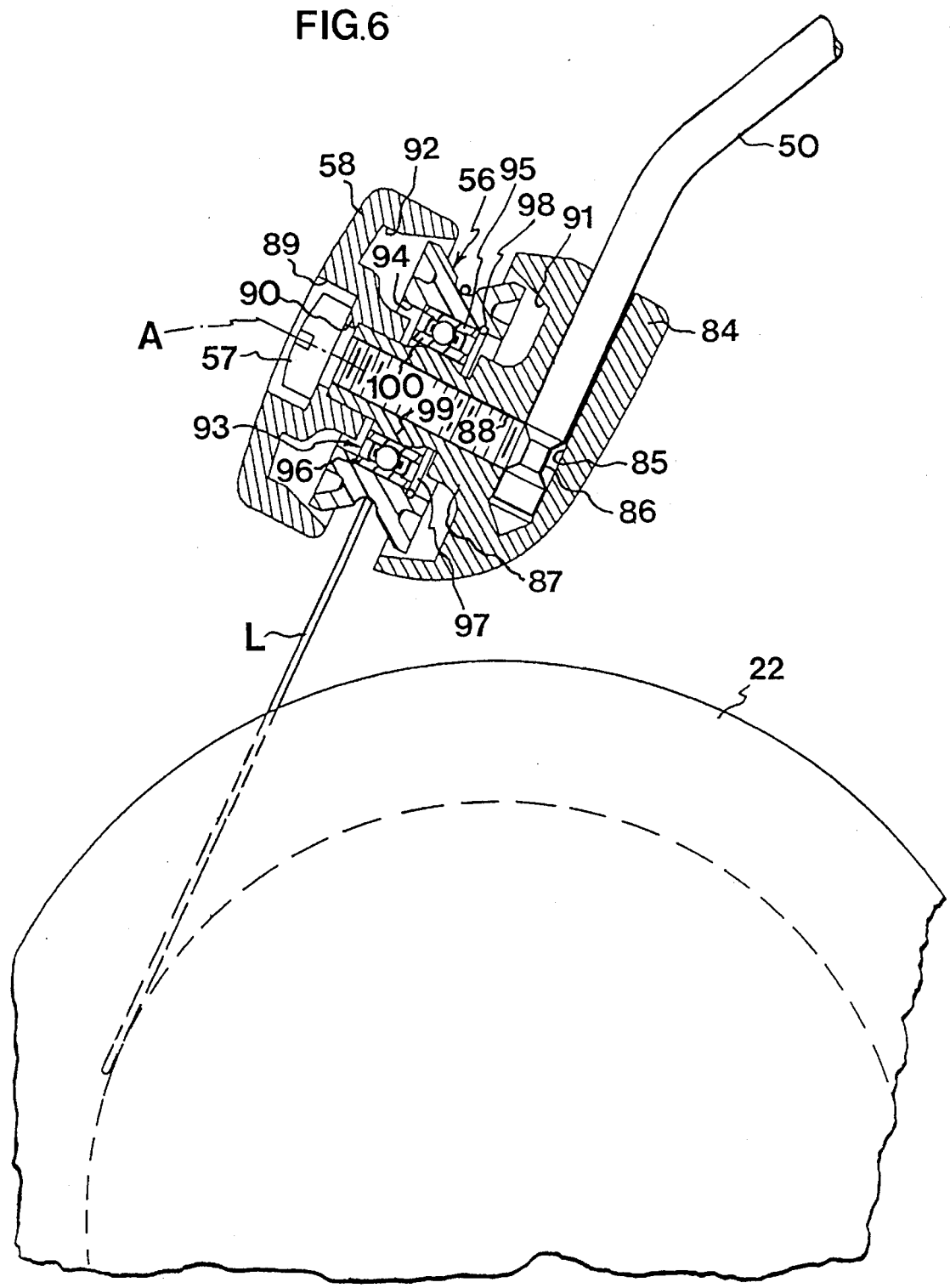

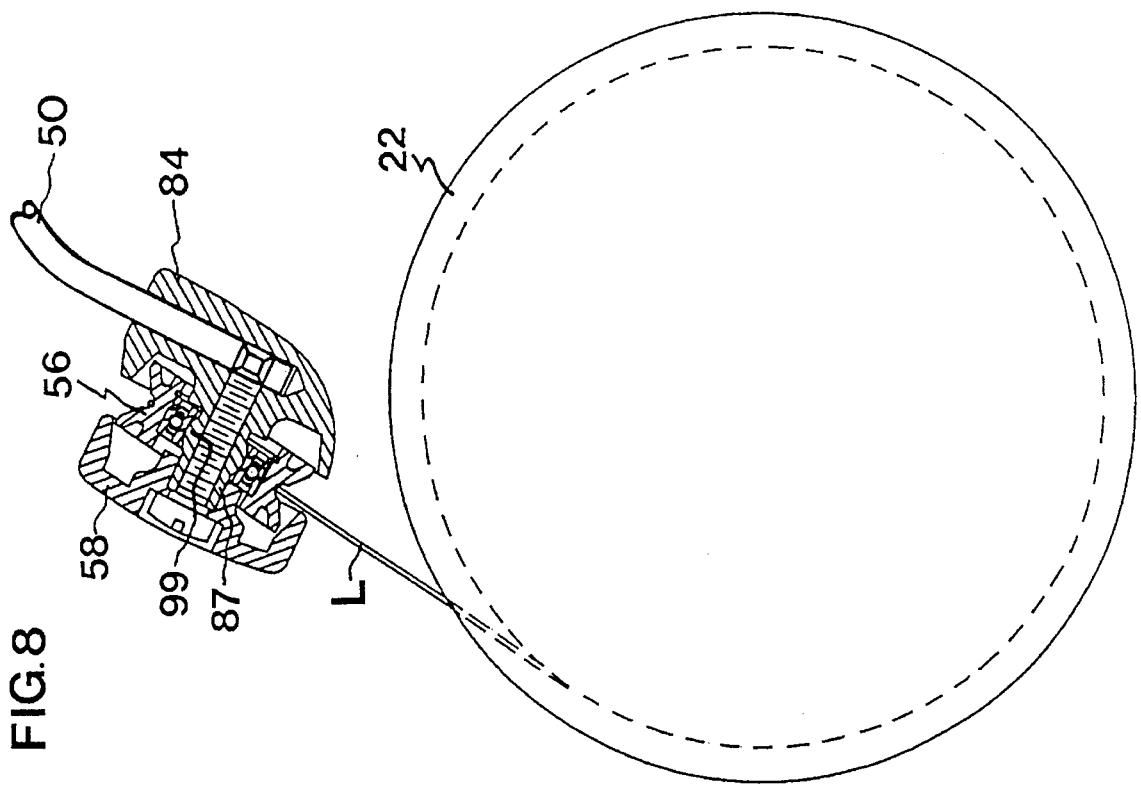
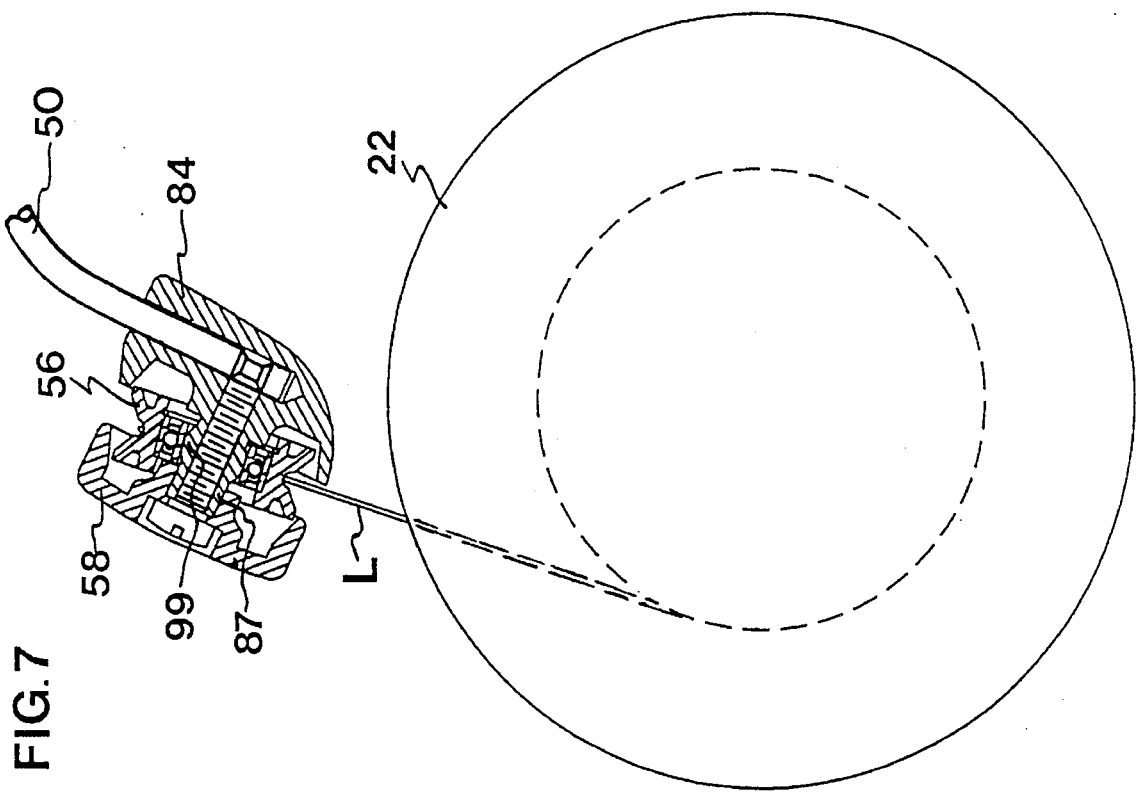

BAIL MECHANISM IN AN OPEN-FACE FISHING REEL OF THE FIXED-SPOOL TYPE

BACKGROUND OF THE INVENTION

The present invention relates to a bail mechanism in an open-face fishing reel of the fixed-spool type.

Prior-art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle, and hence the line spool, in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool. During line retrieve, the line is thus wound onto the line spool which, as opposed to the rotor, does not rotate, but instead executes an axial oscillatory movement. In this manner, the line is distributed over the line spool.

A known bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between an operative folded-in position, in which it extends substantially at right angles to the spindle, and an inoperative folded-out position, in which it is located on the opposite side of the spindle and makes an angle therewith which is of the order of 45°. The bail caries at one end a holder with a pivot pin, on which a line roller is rotatably mounted for guiding the line when being wound onto the line spool. At this end, the bail is connected to one of the mounting elements by means of a screw extending through this mounting element and screwed in said pivot pin.

In its outer circumferential surface, the line roller has a circumferential line-guiding groove which is arc-shaped in cross-section. This line-guiding groove has a width which is substantially equal to the axial length of the line roller. When the line is retrieved, it passes over the line roller in the line-guiding groove, the line roller being rotated by the line. The bail mechanism is so set that the line passes over the line roller while engaging the bottom of the line-guiding groove, when a predetermined line quantity has been wound on the line spool. When a lesser quantity of fishing line is wound on the line spool, for example after a cast, the line engages one groove flank of the line roller and, upon line retrieve and hence a consequent increase of the line quantity on the line spool, progressively approaches the optimum position at the bottom of the line-guiding groove. When the line quantity wound on the line spool exceeds the predetermined line quantity, for example at a subsequent stage of line retrieve, the line engages the other groove flank of the line roller and, upon continued line retrieve, will "climb" this groove flank.

Under practical fishing conditions, the above-described phenomenon has been found to give rise to line twist, in turn resulting in the formation of coils, rendering it difficult to make long casts and being also liable to catch on protruding parts on the fishing reel and on the fishing rod on which the reel is mounted.

SUMMARY OF THE INVENTION

The object of the present invention is to eliminate or at least considerably reduce this drawback and provide a bail mechanism in which the line runs over the line roller along the groove bottom also when the line quantity wound on the line spool deviates from the predetermined line quantity.

According to the present invention, this object is achieved by means of a bail mechanism in an open-face fishing reel of the fixed-spool type having a housing, a rotor mounted on said housing, and a line spool coaxial with said rotor and adapted to oscillate in the axial direction, said bail mechanism comprising a bail for winding a line onto said line spool;

two attachments arranged on said rotor substantially diametrically opposite each other;

two mounting elements carrying said bail and being so rotatably mounted on a respective one of said attachments that said bail is pivotable about a bail axis substantially at fight angles to the axis of said rotor, between a folded-in line-winding position and a folded-out position, in which said bail is released of the line;

a holder fixed to the bail at one end thereof and connected to one mounting element;

a shaft provided between said holder and said one mounting element; and a line roller having a circumferential line-guiding groove in its outer circumferential surface and being mounted on said shaft to guide the line when being wound onto the line spool, said shaft having a radially: projecting, circumferential bead, on which the line roller is mounted and which is so designed that the line roller is tiltable in relation to said shaft about an axis perpendicular thereto.

In a preferred embodiment, the line-guiding groove of the line roller has a bottom portion which is substantially semicircular in cross-section and whose cross-sectional diameter exceeds the diameter of the line.

Preferably, the shaft is integrally formed with the holder, which is connected to said one mounting element by means of a screw screwed in the shaft.

BRIEF DESCRIPTION OF THE DRAWINGS

The invention will now be described in more detail with reference to the accompanying drawings, in which:

FIG. 1 is an exploded view showing a prior-art open-face fishing reel of the fixed-spool type which is provided with the known bail mechanism briefly described above.

FIG. 2 schematically shows a line roller and a line spool in the known fishing reel of FIG. 1, in which a predetermined line quantity is wound on the line spool.

FIG. 3 is similar to FIG. 2, but illustrates the line spool with a lesser line quantity wound thereon in relation to the predetermined line quantity.

FIG. 4 is similar to FIGS. 2 and 3, but illustrates the line spool with a larger line quantity wound thereon in relation to the predetermined line quantity.

FIG. 6 is a sectional view showing a line roller included in the bail mechanism according to the present invention, the line roller being shown in the position it occupies when a predetermined line quantity is wound on the line spool, of the fishing reel.

FIG. 7 is a sectional view showing how the line roller cooperates with the line spool when a lesser line quantity is wound thereon in relation to the predetermined line quantity.

FIG. 8 is a sectional view showing how the line roller cooperates with the line spool when a larger line quantity is wound thereon in relation to the predetermined line quantity.

DESCRIPTION OF THE PREFERRED EMBODIMENT

Figure 5:
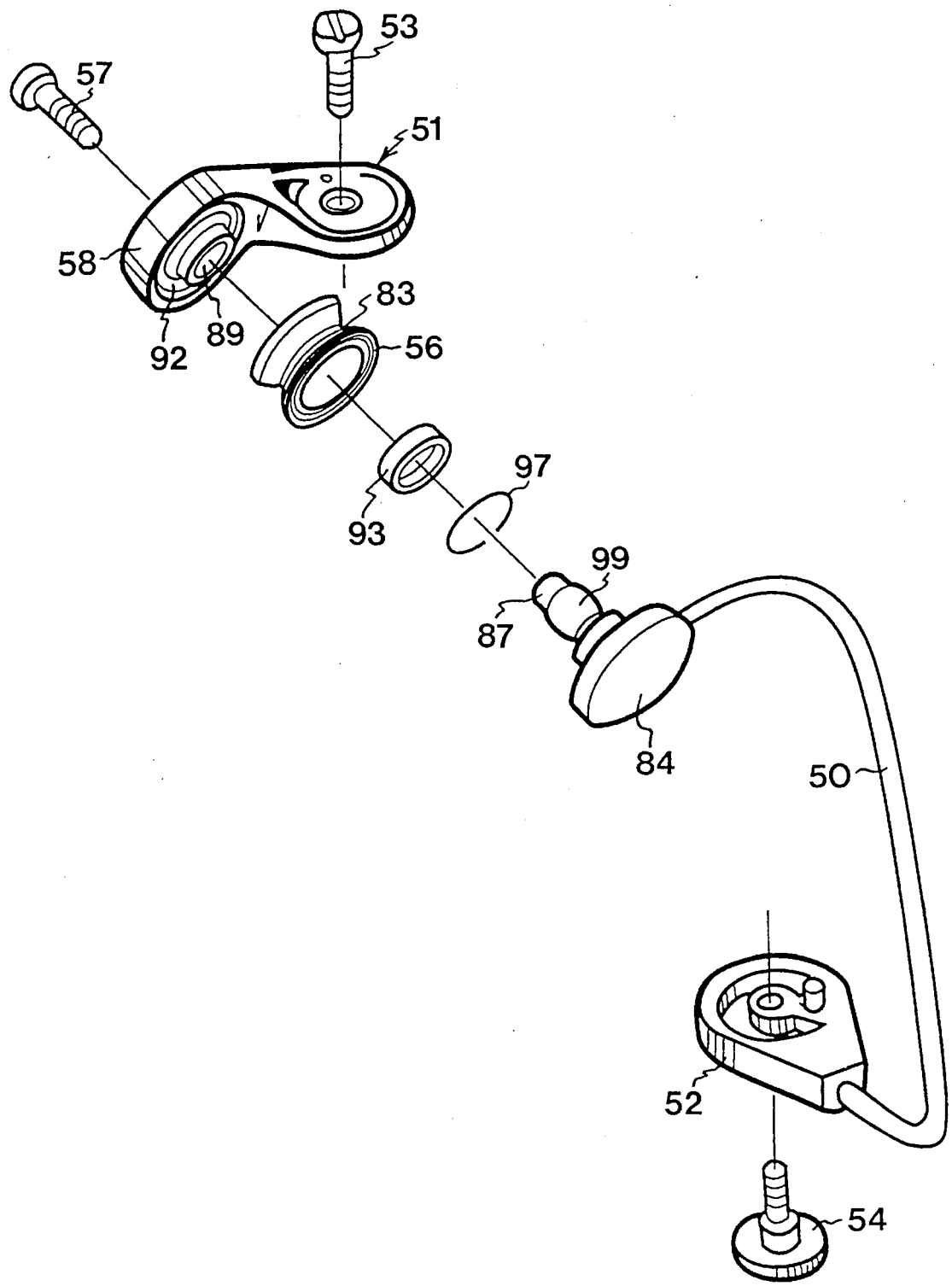
FIG. 5 is a partial exploded view showing parts of a bail mechanism according to the present invention.

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non-rotatably carries a gear unit 12. The gear unit 12 comprises a large driving gear 13 with axially directed teeth on its side facing away from the cover 3, and a small driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed to the housing 1 so as to form what is known as a silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the small driving gear 14 and has an axially directed eccentric pin 17a engaging in a vertical groove (not shown) in a driver element 19. The driver element 19 has a through bore 20, through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24, between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21, which is however rotatable relative the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 non-rotatably connected thereto and meshing with the large driving gear 13. The ball bearing 30 is surrounded by two spacer washers 32 and 33 and held in place by a locking washer 34 engaging in an inner groove 35 in a sleeve 36 axially projecting from said end wall of the housing 1. The rotor shaft 28 has two diametrically opposed planar surfaces 37, forming a flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by means of a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54, forming a pivot shaft for the bail at fight angles to the spindle 21. The bail 50 is pivotable between an operative folded-in position, which is shown in FIG. 1 and in which it extends substantially at fight angles to the spindle 21, and an inoperative folded-out position, in which it is located on the opposite side of the spindle 21 and makes am angle therewith which is of the order of 45°.

A bearing pin 55 for a line roller 56 is fixed to one end of the bail 50. This end of the bail is connected to the mounting element 51 by a screw 57 which extends through an arm 58 on the mounting element 51 and through a spacer sleeve 59 and is screwed in the bearing pin 55.

When turning the handle 5 in the direction of line retrieve P, i.e. in the direction in which a fishing line L fixed to the line spool 22 (FIGS. 2–4) is wound onto the line spool, the large driving gear 13 drives the gear 31, such that the rotor 40, and thus the bail 50, is rotated. At the same time, the small driving gear 14 drives the oscillating gear 17, such that the driver element 19, by the engagement of the eccentric pin 17a in the vertical groove therein, is moved back and forth so as to oscillate the spindle 21, and hence the line spool 22, in the longitudinal direction of the spindle. The spindle 21 and the line spool 22 are however not rotated during line retrieve. The fishing line then passes over the line roller 56 on the folded-in bail 50 so as to rotate the line roller, and is wound onto the line spool 22 during the rotation of the bail. Since the line spool 22 is oscillated during the line-winding operation, the line is distributed axially over the line spool.

Before a east is to be made, the bail 50 is pivoted to the folded-out position so as to release the line from the line roller 56. During the east, the line is paid out from the line spool 22 which, like the rotor 40, remains stationary during the east. When line retrieve is again to be effected after the east, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61, one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing fine attachment 48, the triter 66 has a projection (not shown) engaging in fie groove 65. When the trigger 66 is pivoted, for example by the index finger, a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28, and hence the ring 38 non-rotatably mounted thereon, being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79 on the fixed sleeve 36. The lever 75 is rotatable about a pin 81 parallel to the screw 54, about which the mounting element 52 is rotatable. The mounting-element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74, which in turn acts on the lever 75 in such a direction that, by cooperating with the projection 82, it will pivot the bail 50 to its folded-in position.

In the known fishing reel described above, the bail mechanism suffers from the drawback stated in the introductory part and illustrated in FIGS. 2–4. In its outer circumferential surface, the line roller 56 has a circumferential line-guiding groove 83 of arc-shaped cross-section. The lineguiding groove 83 has a width which is substantially equal to the axial length of the line roller 56. When a predetermined line quantity is wound on the line spool 22 (FIG. 2), the line L passes during line retrieve over the line roller 56 while engaging the bottom of the groove 83. When there is a lesser line quantity wound on the line spool 22 (FIG. 3), for example after a cast, the line L engages one groove flank of the line roller 56 and, during retrieve of the line L and hence a subsequent increase of the line quantity on the line spool 22, progressively approaches the optimum position at the bottom of the line-guiding groove 83. In the case of a larger line quantity wound on the line spool 22 in relation to the predetermined line quantity, for example at a later stage of the retrieve of the line L, the line engages the other groove flank of the line roller 56 and, during continued retrieve of the line L, will "climb" this groove flank.

A bail mechanism according to the present invention will now be described in more detail with reference to FIGS. 5–8. The bail mechanism according to FIG. 5 is intended for use in the fishing reel described above and illustrated in FIG. 1. The parts of the bail mechanism according to the invention that have equivalent parts in the bail mechanism of FIG. 1 have been given the same reference numerals as these. It should be pointed out that the two attachments 48 and 49, which are not shown in FIG. 5, also form part of the bail mechanism. It should also be noted that the bail mechanism according to the invention can of course be used in open-face fishing reels of the fixed-spool type of designs other than that shown in FIG. 1.

Like the bail mechanism described above, the bail mechanism according to the invention comprises a bail 50 for winding a line L onto the line spool 22, two attachments 48 and 49 arranged on the rotor 40 diametrically opposite each other, and two mounting elements 51 and 52 which carry the bail 50 and are rotatably connected to the attachments 48 and 49 in the manner described above by means of screws 53 and 54 forming the pivot shaft of the bail 50.

In the bail mechanism of the invention, the bearing pin 55 has been replaced by a holder 84, which is fixed to one end of the bail 50. This bail end is inserted in a bore 85 in the holder 84 and has a circumferential groove 86. The holder 84 has integrally formed therewith a projecting shaft 87, on which the line roller 56 is rotatably mounted. The shaft 87 has a threaded bore 88 extending axially through the shaft 87 and opening in the bore 85. The holder 84 is connected to the mounting element 51 by means of a screw 57 passing through a hole 89 in an arm 58 on the mounting element 51 and screwed in the shaft bore 88. The screw 57 engages in the circumferential groove 86 of the bail end so as to retain the bail 50 in the bore 85. The shaft 87 bears with its free end on one side of a lug 90 provided in the hole 89 of the arm 58. The head of the screw 57 bears on the other side of the lug 90.

In their surfaces facing each other, the holder 84 and the arm 58 have an annular recess 91 and 92, respectively, concentric with the shaft 87. The recesses 91 and 92 form an annular space, in which the line roller 56 is accommodated.

The line roller 56 is rotatably mounted on the shaft 87 by means of a ball bearing 93 sealed at both sides. The ball bearing 93 is inserted in the center hole 94 of the line roller 56, its outer ring 95 bearing at one side thereof on an annular lug 96 provided in the center hole 94, and being locked at its other side by a locking ting 97 disposed in a circumferential groove 98 in the boundary wall of the center hole 94.

The shaft 87 has a radially projecting, circumferential bead 99. The bead 99 is symmetrical with respect to a plane perpendicular to the shaft 87, and has on each side of this plane a diameter which decreases axially away therefrom in such a manner that its circumferential surface exhibits an arcuate cross-sectional shape. The inner ring 100 of the ball bearing 93 is mounted on the bead 99. The ball bearing 93, and hence the line roller 56, can then tilt about an axis perpendicular to the shaft 87, between two outer positions (FIGS. 7 and 8), in which the inner ring 100 of the ball bearing 93 bears on the arm 58 in two different, diametrically opposed positions.

The circumferential line-guiding groove 83 of the line roller 56 has two inclined groove flanks substantially rectilinear in cross-section, and a bottom portion substantially semicircular in cross-section, whose cross-sectional diameter exceeds the diameter of the line L.

The bail mechanism according to the invention is so set that the line roller 56 occupies the position shown in FIG. 6, in which it is at right angles to the shaft 87, when a predetermined line quantity is wound on the line spool 22. In the case of a lesser line quantity on the line spool 22, the line roller 56 occupies a position (FIG. 7) which is inclined in one direction in relation to the shaft 87 and to which it is moved by the line L located in the bottom portion of the line-guiding groove 83. In the case of a larger line quantity wound on the line spool 22 in relation to the predetermined line quantity, the line roller 56 occupies a position (FIG. 8) which is inclined in the other direction in relation to the shaft 87 and to which it is moved by the line L located in the bottom portion of the line-guiding groove 83. Since the line roller 56 is tiltable about the bead 99 in this manner, the line L will be retained in the bottom portion of the line-guiding groove 83, thereby preventing line twist as described in the introductory part of the specification.

What I claim and desire to secure by Letters Patent is:

1. A bail mechanism in an open-face fishing reel of the fixed-spool type having a housing, a rotor mounted on said housing, and a line spool coaxial with said rotor and adapted to oscillate in the axial direction, said bail mechanism comprising a bail for winding a line onto said line spool;

two attachments arranged on said rotor substantially diametrically opposite each other;

two mounting elements carrying said bail and being so rotatably mounted on a respective one of said attachments that said bail is pivotable about a bail axis substantially at right angles to the axis of said rotor, between a folded-in-line winding position and a folded-out position, in which said bail is released of the line;

a holder fixed to said bail at one end thereof and connected to one of said mounting elements;

a shaft provided between said holder and said one mounting element; and a line roller having a circumferential line-guiding groove in its outer circumferential surface and rotatably mounted on said shaft so as to guide the line when being wound onto the line spool, the line roller being rotatably mounted on the shaft by means of a ball bearing having an outer ring and an inner ring, and said shaft having a radially projecting, circumferential bead, on which the inner ring of the ball bearing is mounted and which is so designed that the ball bearing and hence the line roller are tiltable in relation to said shaft about an axis perpendicular thereto between two outer positions, in which the inner ring of the ball bearing bears on said one mounting element in two diametrically opposed positions.

2. The bail mechanism as claimed in claim 1, wherein the line-guiding groove of the line roller has a bottom portion of substantially semicircular cross-section, whose cross-sectional diameter exceeds the diameter of the line.

3. The bail mechanism as claimed in claim 2, wherein the shaft is integrally formed with the holder, and wherein the holder is connected to said one mounting element by means of a screw which is screwed in said shaft.

4. The bail mechanism as claimed in claim 1, wherein the shaft is integrally formed with the holder, and wherein the holder is connected to said one mounting element by means of a screw which is screwed in said shaft.

5. In an open-face fishing reel of the fixed-spool type having a bail mechanism, a housing, a rotor mounted on the housing, and a line spool coaxial with the rotor and adapted to oscillate in the axial direction; the bail mechanism being of the type having a bail for winding a line onto the line spool, two attachments arranged on the rotor substantially diametrically opposite each other, two mounting elements carrying the bail and being so rotatably mounted on a respective one of the attachments that the bail is pivotable about a bail axis substantially at right angles to the axis of the rotor, between a folded-in-line winding position and a folded-out position, in which the bail is released from the line, a holder fixed to the bail at one end thereof and connected to one of the mounting elements, and a line roller being rotatably mounted on the shaft so as to guide the line when being wound onto the line spool;

the improvement comprising:

a shaft provided between the holder and the one mounting element;

the line roller including a circumferential line-guiding groove in an outer circumferential surface thereof;

the line roller being rotatably mounted on the shaft by a low-friction rolling-element bearing for spinning motion of the line roller about a bearing axis of the rolling-element bearing;

the line roller being rotatably mounted on the shaft by a plain bearing for angular displacement of the bearing axis; and wherein the plain bearing includes a rounded circumferential bead outwardly projecting from the shaft, the bead being disposed within an inner ring of the rolling-element bearing.

6. The improvement according to claim 5, wherein the one of the mounting elements and the holder each include a respective annular stop disposed on either side of an inner ring of the rolling-element bearing such that the angular displacement of the bearing axis is limited by the inner ring bearing against the mounting elements or the holder.

7. The improvement according to claim 5, wherein the line-guiding groove of the line roller includes a bottom portion of substantially semicircular cross-section, whose cross-sectional diameter exceeds the diameter of the line.

8. The improvement according to claim 5, wherein the shaft is integrally formed with the holder, and wherein the holder is connected to the one mounting element by means of a screw which is screwed in the shaft.

* * * * *